(12) United States Patent
Shoji et al.

(10) Patent No.: US 7,034,526 B2
(45) Date of Patent: Apr. 25, 2006

(54) MAGNETIC FIELD FORMING DEVICE AND DISPLACEMENT SENSOR USING SAME

(75) Inventors: Yukio Shoji, Tochigi (JP); Yuichi Yamamoto, Tochigi (JP); Nobumi Yoshida, Tochigi (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 11/135,657

(22) Filed: May 24, 2005

(65) Prior Publication Data
US 2005/0264280 A1    Dec. 1, 2005

(30) Foreign Application Priority Data
May 28, 2004  (JP)  ............... 2004-159996

(51) Int. Cl.
*G01B 7/30*   (2006.01)

(52) U.S. Cl. ................................. 324/207.25

(58) Field of Classification Search ........... None
See application file for complete search history.

(56) References Cited

U.S. PATENT DOCUMENTS

2001/0015642 A1 *  8/2001  Fischer et al. ........... 324/207.2
2005/0127903 A1 *  6/2005  Sogge ...................... 324/207.2

FOREIGN PATENT DOCUMENTS

JP        2001-263319        9/2001

* cited by examiner

*Primary Examiner*—Bot LeDynh
(74) *Attorney, Agent, or Firm*—Westerman, Hattori, Daniels & Adrian, LLP

(57) ABSTRACT

In a displacement sensor (10), a shaft (24) of a movable member (14) comprises a tubular part (26) having an opening (26c) at one end. A rod-form permanent is inserted into the tubular part (26) through the opening (26c). A spacer (32) is fitted over a narrow portion of the rod-form magnet (28). The thickest portion of the magnet (28) and the spacer (32) contact the side wall of the tubular part (26) tightly, so that the magnet (28) is disposed coaxially with the tubular part (26). A stopper (26d) is formed on the opening (26c) of the tubular part (26), so that the magnet (28) does not move axially. Therefore, the magnet (28) is mounted in a prescribed position in a movable member (14) with a high degree of accuracy.

5 Claims, 6 Drawing Sheets

10 DISPLACEMENT SENSOR
12 SENSOR MAIN BODY
14 MOVABLE PLUG
16 MAIN BODY HOUSING
18 MAIN BODY CAP
20 PRESSURE-RESISTANT SLEEVE
22 CENTRAL AXIS
24 SHAFT
26 HOLDER
26a CYLINDRICAL INNER SPACE OF HOLDER
26b SIDE WALL OF HOLDER
26c OPENING OF HOLDER
26d STOPPER (CLAW) OF HOLDER
26e PRESSURE RELEASE HOLE OF HOLDER
30 MOVING SPACE
33 MAGNETIC FIELD
34A, 34B HALL IC

MAGNETIC FIELD FORMING DEVICE AND DISPLACEMENT SENSOR USING SAME

CROSS-REFERENCE TO RELATED APPLICATIONS

This application relates to and claims priority from Japanese Patent Application No. 2004-159996, filed on May 28, 2004, the entire disclosure of which is incorporated herein by reference.

BACKGROUND OF THE INVENTION

1. Field of the Invention

The present invention relates to a displacement sensor comprising a magnetic sensing device such as a Hall IC, and a magnetic field forming device for generating a magnetic field, which is capable of moving relative to the magnetic sensing device. The displacement sensor outputs f from the magnetic sensing device an electric signal having a level which corresponds to the relative displacement between the magnetic sensing device and the magnetic field forming device.

The present invention also relates to a magnetic field forming device for providing a magnetic field in an exterior space using a magnetic member such as a permanent magnet.

2. Description of the Related Art

A position measuring device (displacement sensor) disclosed in Japanese Unexamined Patent Application Publication 2001-263319 comprises a permanent magnet mounted on a movable member such as a drive shaft of an intake exhaust valve of an engine. The position (displacement) of the intake exhaust valve is detected by the permanent magnet and a Hall element. The rod-form permanent magnet is accommodated in a tubular member coupled to an end of the drive shaft, and fixed elastically within the tubular member by an adhesive such as an epoxy resin.

In this type of displacement sensor, finishing of the permanent magnet is difficult, and hence it is difficult to mount the permanent magnet directly onto the movable member such as the aforementioned drive shaft of the intake exhaust valve. Therefore, in the invention disclosed in Japanese Unexamined Patent Application Publication 2001-263319, a constitution is employed whereby the tubular member is attached to the detection subject, and the permanent magnet is accommodated in and fixed to the tubular member. With this constitution, the permanent magnet must be disposed in a prescribed position within the tubular member, typically a position in which the central axis of the permanent magnet matches the central axis of the tubular member (in other words, a coaxial position with the tubular member). However, with the assembly method described in Japanese Unexamined Patent Application Publication 2001-263319, in which an adhesive is used to fix the permanent magnet inside the tubular member, it is difficult to align the central axis of the permanent magnet with the central axis of the tubular member with precision. Moreover, with this assembly method, a considerable amount of time is required for the adhesive to harden, and hence the assembly process is slow.

SUMMARY OF THE INVENTION

It is therefore an object of the present invention to provide a magnetic field forming device and a displacement sensor using same in which a magnetic member such as a permanent magnet can be mounted in a prescribed position with a high degree of precision.

Another object of the present invention is to facilitate the mounting operation of the magnetic member.

A magnetic field forming device for providing a magnetic field in an exterior space according to the present invention comprises: a shaft having a tubular part with a side wall which surrounds a columnar interior space, and an opening provided in one end of the tubular part; a rod-form magnetic member for generating the magnetic field, which is inserted into the interior space in the tubular part of the shaft and fixed to the tubular part; and an annular spacer which is fitted over the magnetic member and attached firmly to the side wall of the tubular part, thereby fixing a central axis of the magnetic member in a prescribed position within the tubular part.

In this magnetic field forming device, the annular spacer which is fitted over the rod-form magnetic member contacts the sidewall of the tubular part of the shaft tightly, thereby fixing the central axis of the magnetic member in a prescribed position in the interior space of the tubular part (for example, the position of the central axis of the interior space). Hence, by means of a simple operation performing during assembly to fit the annular spacer over the magnetic member and insert the magnetic member into the interior space of the tubular part from the opening on one end of the shaft, the central axis of the magnetic member can be positioned in the prescribed position within the interior space with a high degree of precision.

In a preferred embodiment, the rod-form magnetic member takes a form in which the outer diameter thereof varies axially (for example, a spindle form in which the central location is thickest). The interior space of the tubular part of the shaft is formed in a size and shape which fit the thickest location of the magnetic member. Thus the magnetic member contacts the side wall of the tubular part of the shaft tightly at its thickest location. The annular spacer is then fitted over a single predetermined location on the narrower part of the magnetic member so as to contact the side wall of the tubular part of the shaft tightly. As a result, the central axial position of the magnetic member is fixed by the thickest location of the magnetic member and the annular spacer. According to this constitution, the central axial position of the magnetic member can be fixed in a prescribed position within the tubular part by means of an extremely simple operation, performed during assembly, to fit the single annular spacer over the aforementioned single predetermined location of the magnetic member, and insert the magnetic member into the interior space of the tubular part.

In a preferred embodiment, a stopper is provided in the vicinity of the opening in the tubular part for fixing the magnetic member within the tubular part such that the magnetic member does not move in the direction of the central axis. According to this constitution, the magnetic member can be fixed within the shaft completely by means of a simple operation, performed during assembly, to insert the magnetic member into the interior space of the tubular part of the shaft, and form the stopper in the vicinity of the opening such that the magnetic member does not fall out of the tubular part.

In a preferred embodiment, the spacer is disposed in the vicinity of the opening of the tubular part, and one or more holes or grooves are provided in the spacer. The stopper is provided in the vicinity of the opening in a position which does not block the hole or groove.

In a preferred embodiment, one or more holes or grooves for linking the interior space of the tubular part of the shaft to an exterior space of the shaft are provided in the side wall of the tubular part or the spacer. When this displacement sensor is applied as a differential oil pressure sensor or a hydraulic valve stroke sensor or the like, for example, the space in which the movable member moves (i.e. the exterior space of the shaft) is filled with hydraulic fluid, and the oil pressure of this exterior space tends to vary greatly. The hole or groove linking the exterior space to the interior space prevents the differential pressure between the exterior space and interior space from becoming excessive even in cases where the pressure of the exterior space varies greatly in this manner, and as a result, the danger of this differential pressure pushing the magnetic member out of the shaft or breaking the shaft is eliminated.

A displacement sensor according to another aspect of the present invention comprises a main body having a magnetic sensing device, and the magnetic field forming device constituted as described above, which is capable of moving relative to the main body, and which provides a magnetic field of an intensity corresponding to displacement in the position of the magnetic sensing device.

DESCRIPTION OF THE PREFERRED EMBODIMENTS

Figure 1:
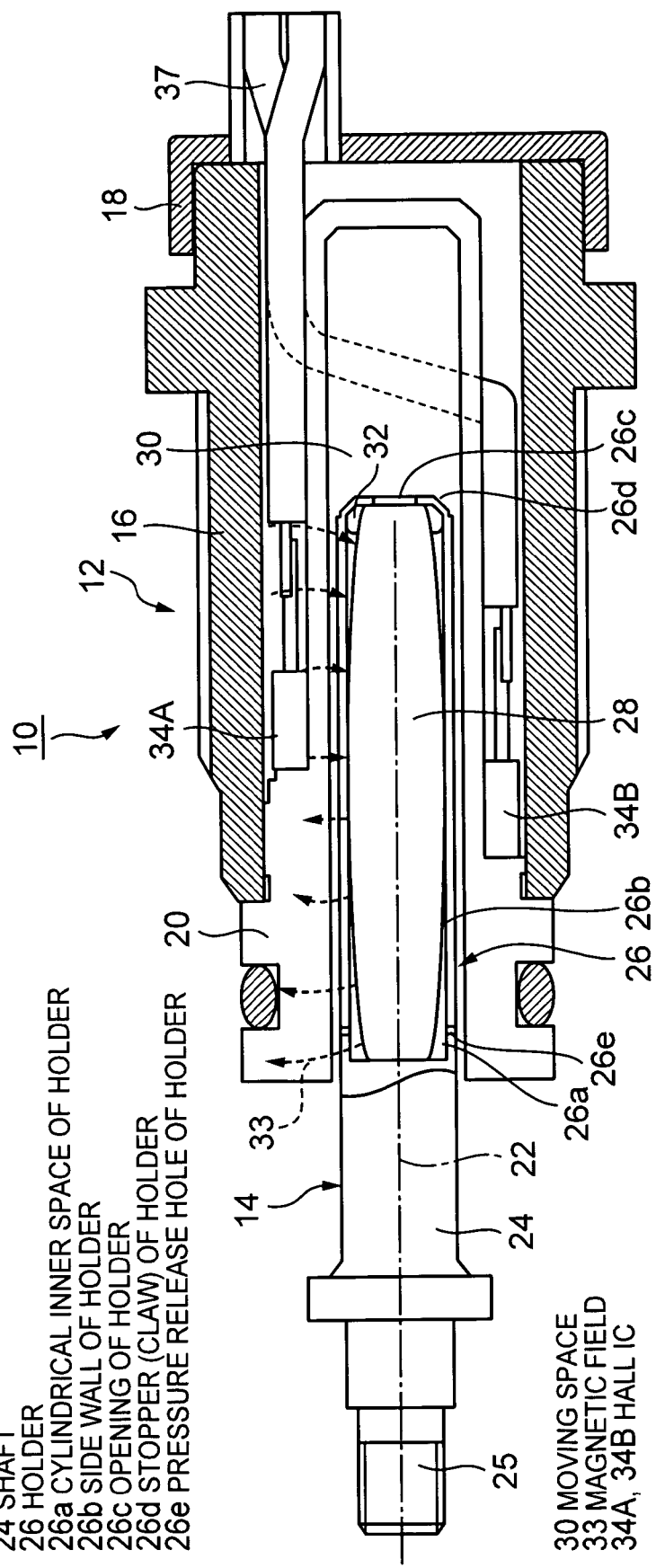
FIG. 1 is a sectional view of an embodiment of a displacement sensor using a magnetic field forming device according to the present invention.

FIG. 1 is a sectional view of an embodiment of a displacement sensor using a magnetic field forming device according to the present invention. In the drawing, components illustrated by diagonal shading are made from magnetic materials. With the exception of a permanent magnet 28, components outlined in black are made from non-magnetic materials (for example, non-magnetic stainless steel, plastic, rubber, and so on).

As shown in FIG. 1, a displacement sensor 10 comprises a sensor main body 12, and a rod-form magnetism forming device ("movable plug" hereafter) 14 which is inserted into the sensor main body 12 so as to be capable of axial movement. The sensor main body 12 comprises a tubular main body housing 16 having openings at the front and rear ends, and a main body cap 18 which is fitted onto the rear end of the main body housing 16. The main body housing 16 and main body cap 18 are both made from magnetic materials, constitute the outer shell of the sensor main body 12, and function to magnetically shield the interior of the sensor main body 12 from the outside.

A pressure-resistant sleeve 20 is inserted into and fixed to the main body housing 16 from the opening side on the front end thereof. One or a plurality of (two in this embodiment, for example) magnetic sensing devices, for example Hall ICs 34A, 34B, are fixed in different positions on the outer surface of the pressure-resistant sleeve 20. Output signals from these Hall ICs 34A, 34B are discharged to the exterior of the sensor main body 12 through a signal cable 37, and inputted into a signal processing circuit not shown in the drawing.

The pressure-resistant sleeve 20 has an opening in its front end, and a movement space 30 for the movable plug 14, which takes an elongated columnar form surrounded by the wall of the pressure-resistant sleeve 20, is provided on the inside of the pressure-resistant sleeve 20. A typical application for the displacement sensor 10 is to detect displacement in a hydraulic machine, for example the displacement of a spool which is moved by differential oil pressure or the stroke of a hydraulic valve. In such an application, the movement space 30 inside the pressure-resistant sleeve 20 is filled with high-pressure hydraulic fluid such that high oil pressure is applied to the wall of the pressure-resistant sleeve 20. The pressure-resistant sleeve 20 is made from a robust non-magnetic material (non-magnetic stainless steel, for example), and therefore has sufficient strength to withstand the high oil pressure from the interior space 30.

The movable plug 14 is inserted into the movement space 30 from the opening on the front end of the pressure-resistant sleeve 20. The movable plug 14 is disposed in a coaxial position with the movement space 30. The movable plug 14 is capable of moving within a fixed distance range along a central axis 22 thereof. The outer diameter of the part of the movable plug 14 that is inserted into the pressure-resistant sleeve 20 is slightly smaller than the inner diameter of the pressure-resistant sleeve 20, and hence a slight clearance is secured between the outer surface of the movable plug 14 and the inner surface of the pressure-resistant sleeve 20, enabling the movable plug 14 to move smoothly. As described above, in an application to detect displacement in a hydraulic machine, the gap (movement space 30) between the movable plug 14 and pressure-resistant sleeve 20 is filled with hydraulic fluid.

The main body of the movable plug 14 is constituted by a substantially columnar shaft 24 made from a non-magnetic material. A screw is formed on a front end part 25 of the shaft 24 for coupling the movable plug 14 to a displacement measurement subject, for example a spool of a hydraulic valve or the like. A part 26 of the rear half of the shaft 24 which is inserted into the pressure-resistant sleeve 20 serves as a holder for fixing the permanent magnet 28. The holder 26 is cylindrical, and comprises a side wall 26b surrounding a columnar interior space 26a, and an opening 26c on the rear end thereof. The round rod-form permanent magnet 28 is accommodated in the interior space 26a of the holder 26. A plurality of claws 26d is provided on the rear end edge of the side wall 26b of the holder 26. These claws 26d are bent inward so as to close the opening 26c, thereby contacting the rear end surface of the permanent magnet 28. In other words, the claws 26d serve as a stopper for fixing the permanent magnet 28 within the holder 26 such that the permanent magnet 28 does not move in the direction of the central axis 22. Further, the permanent magnet 28 is fixed in a coaxial position with the holder 26 using a method to be described below.

The permanent magnet 28 is molded into a form having a different thickness (outer diameter) according to its location in the direction of the central axis 22. In this embodiment, for example, the permanent magnet 28 is molded into a spindle form which is thickest in the central location in the axial direction, and tapers toward the two ends. This form was selected for the permanent magnet 28 to give a predetermined characteristic (linear, for example) to the intensity distribution (particularly the intensity of the magnetic field components detected by the Hall ICs 34A, 34B) of a magnetic field 33 formed by the permanent magnet 28. The interior space 26a of the holder 26 takes a form and size which fit the thickest location (the central location in this embodiment) of the permanent magnet 28. Accordingly, in the thickest central location, the permanent magnet 28 contacts the side wall 26b of the holder 26 tightly. An annular spacer 32 is fitted over the narrow rear end portion of the permanent magnet 28. The inner surface of the spacer 32 contacts the permanent magnet 28 tightly, and the outer surface of the spacer 32 contacts the side wall 26b of the holder 26 tightly. Hence the permanent magnet 28 is fixed to the holder 26 at its thickest central location and the two rear end locations to which the spacer 32 is attached such that the axial position of the permanent magnet 28 matches the central axis 22 of the holder 26. By selecting the material of the spacer 32 appropriately, it is also possible to relieve stress applied to the permanent magnet 28.

The interior space 26a of the holder 26 is divided into two regions comprising a region to the front of the central portion of the permanent magnet 28 and a region to the rear of the central portion. A pressure releasing hole 26e linking the front region of the interior space 26a of the holder 26 to the exterior space (i.e. the movement space 30) of the holder 26 is pierced into the side wall 26b of the holder 26 in one or a plurality of locations. Further, as shown in FIG. 2, to be described hereafter, a pressure releasing groove 32c linking the rear region of the interior space 26a of the holder 26 to the exterior space (movement space 30) of the holder 26 is formed in the spacer 32. In the aforementioned application for measuring displacement in a hydraulic machine, the exterior space (movement space 30) of the holder 26 is filled with high-pressure hydraulic fluid, and particularly in the case of a construction machine or the like, the oil pressure of the hydraulic fluid varies greatly. Through the action of the pressure releasing hole 26e and pressure releasing groove 32c, differential pressure between the interior space 26a of the holder 26 and the exterior space (movement space 30) can be suppressed even in such a case, and hence problems caused when the differential pressure becomes excessive are prevented.

Envisaging a structure in which neither the pressure releasing hole 26e nor the pressure releasing groove 32c is formed, for example, when the oil pressure of the exterior space (movement space 30) of the holder 26 becomes extremely high, the hydraulic fluid at this high pressure may pass through the minute gap between the spacer 32 or permanent magnet 28 and the side wall 26b of the holder 26, and enter the interior space 26a. When the oil pressure of the exterior space (movement space 30) of the holder 26 falls subsequently, the high oil pressure in the interior space 26a may push the permanent magnet 28 out of the holder 26 or cause the holder 26 to break. Such problems are solved by the pressure releasing hole 26e and pressure releasing groove 32c described above.

Figure 2A:
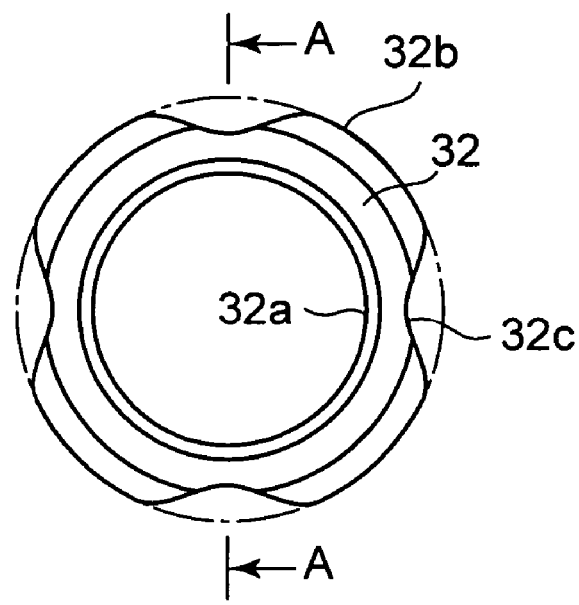
FIG. 2A is a front view of a spacer seen from the front.
Figure 2B:
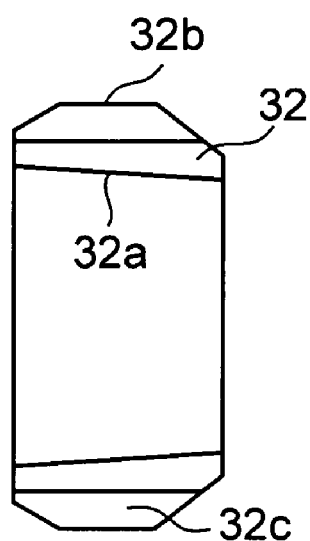
FIG. 2B is a sectional view along a line A—A in FIG. 2A.

FIG. 2 shows the constitution of the spacer 32. FIG. 2A is a front view of the spacer 32 seen from the front, and FIG. 2B is a sectional view along a line A—A in FIG. 2A.

As shown in FIG. 2, the spacer 32 comprises an inner surface 32a for contacting the permanent magnet 28 tightly, and an outer surface 32b for contacting the side wall 26b of the holder 26 tightly. The pressure releasing groove 32c is formed in one or a plurality of locations in the outer surface 32b.

Figure 3A:
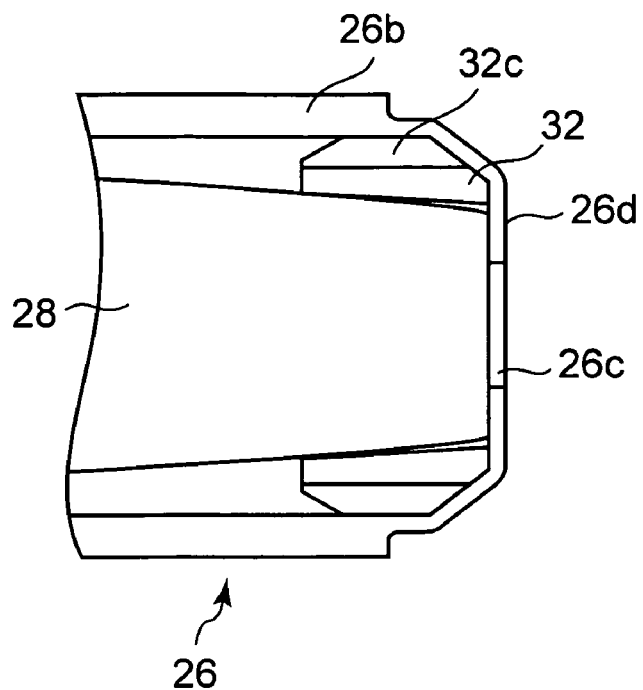
FIG. 3A is a sectional view along a central axis of a structure at a rear end portion of a holder for fixing a permanent magnet.
Figure 3B:
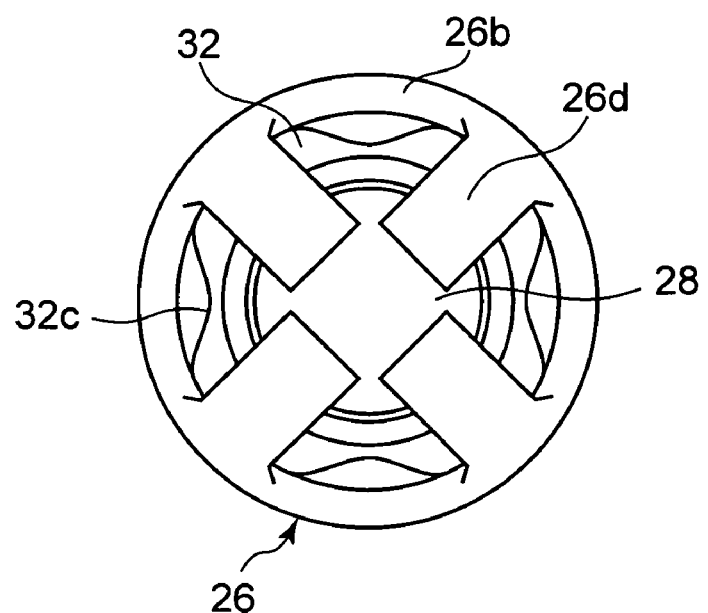
FIG. 3B is a rear view of the rear end portion of the holder seen from the rear.

FIG. 3 shows the structure at the rear end portion of the holder 26 for fixing the permanent magnet 28. FIG. 3A is a sectional view along the central axis 22 of the structure at the rear end portion of the holder 26, and FIG. 3B is a rear view of the rear end portion of the holder 26 seen from the rear.

As shown in FIG. 3, the four, for example, claws 26d extending from the edge of the rear end of the holder 26 are bent inward over the outer form of the rear end portion of the spacer 32 and permanent magnet 28, thereby serving as a stopper for fixing the permanent magnet 28 securely so that the permanent magnet 28 does not move axially. As shown in FIG. 3B, the pressure releasing grooves 32c of the spacer 32 are positioned in the spaces between adjacent claws 26d.

Figure 4A:
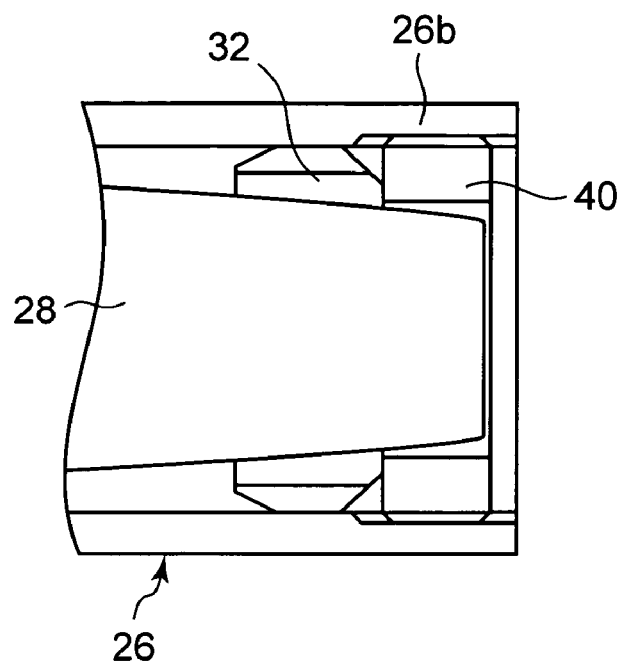
FIG. 4A is a sectional view showing a modified example of a stopper using a screw.
Figure 4B:
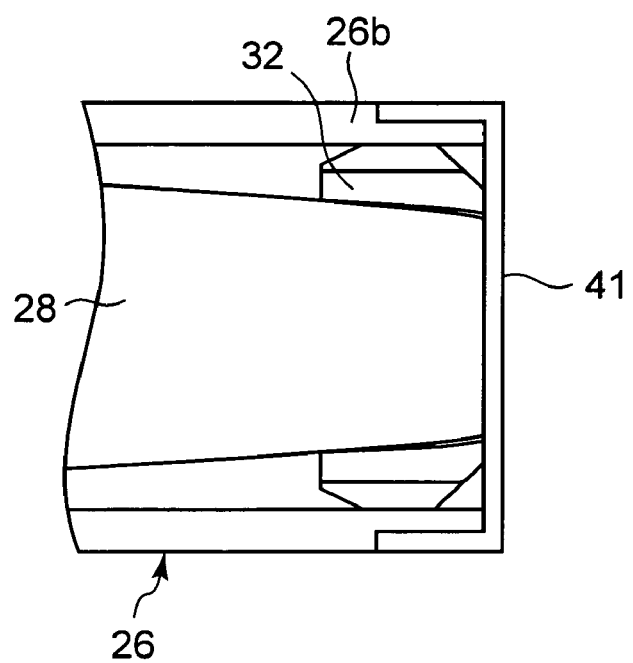
FIG. 4B is a sectional view showing a modified example of the stopper using a lid.

Note that various constitutions may be used as the stopper other than the plurality of bent claws 26d that are separated as shown in FIG. 3. For example, the rear end edge of the holder 26 may be caulked so as to bend inward uniformly over the entire circumference of the holder 26, thereby serving as a stopper. Alternatively, as shown in FIG. 4A, a screw 40 screwed into the holder 26 may be used as a stopper to fix the permanent magnet 28 and spacer 32. Alternatively, as shown in FIG. 4B, a lid 41 placed on the holder 26 may be used as a stopper to fix the permanent magnet 28 and spacer 32. Furthermore, additional pressure releasing holes may be opened in the side wall 26b of the holder 26 rather than providing the pressure releasing grooves 32c in the spacer 32.

Figure 5A:
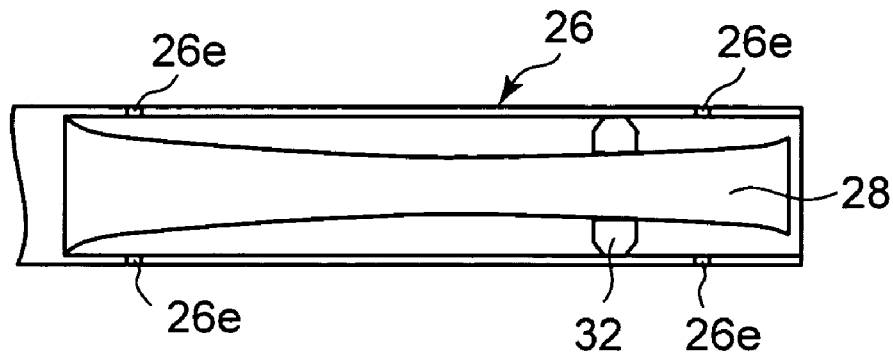
FIGS. 5A through 5C are sectional views showing a modified example of a structure for fixing the axial position of a permanent magnet having a different form.
Figure 5B:
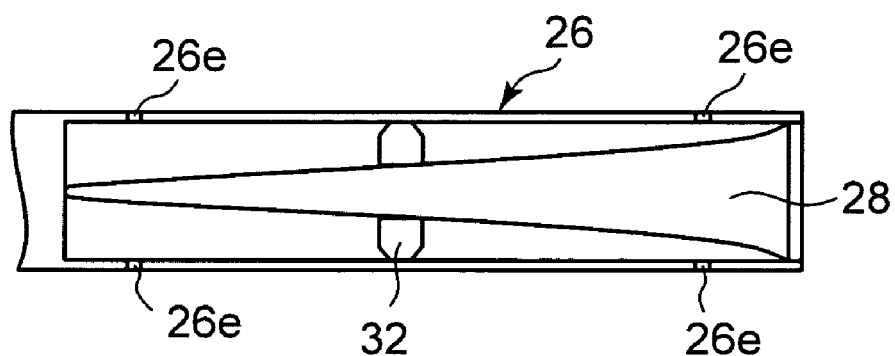
Figure 5C:
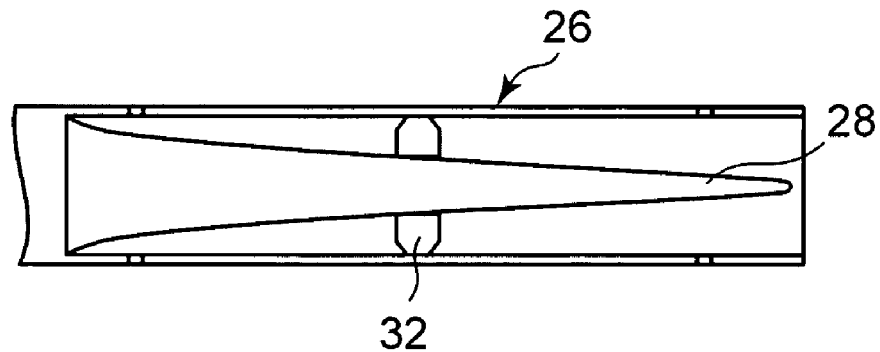

Moreover, a different form to the spindle form shown in FIG. 1 may be employed for the permanent magnet 28 depending on the desired distribution characteristic of the magnetic field 33. Further, as shown by the examples in FIGS. 5A through 5C, the structure for fixing the axial position of the permanent magnet 28 (for example, the position, size, and so on of the spacer 32) may be varied according to the form of the permanent magnet 28.

Figure 6:
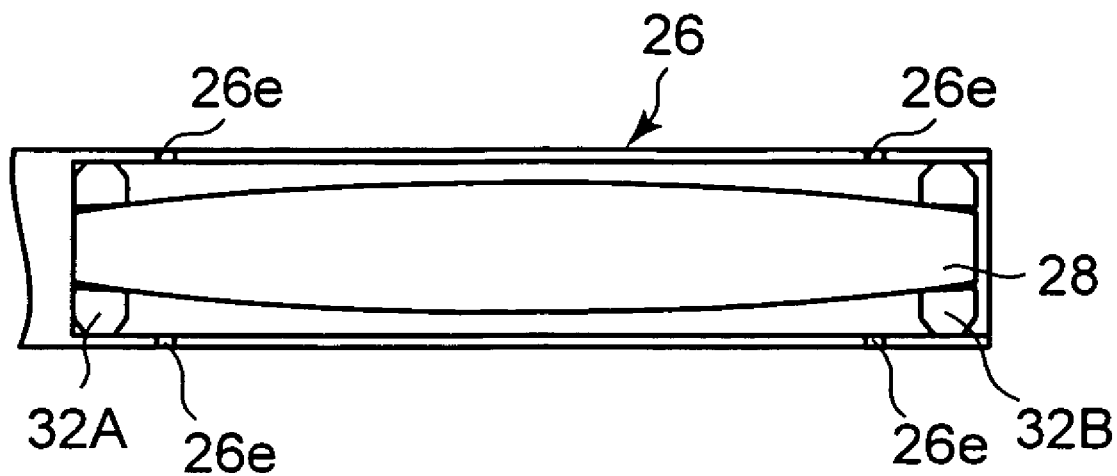
FIG. 6 is a sectional view showing a modified example in which the axial position of the permanent magnet is fixed using spacers in two locations.

Furthermore, in the examples illustrated respectively in FIGS. 1 and 5A to 5C, the permanent magnet 28 contacts the side wall 26b of the holder 26 tightly at its thickest location, and its axial position is fixed by attaching the spacer 32 in another location. Additionally, however, the spacer 32 maybe attached in a plurality of, for example two, locations on the permanent magnet 28 such that the axial position of the permanent magnet 28 is fixed by the spacers 32 in these two locations. FIG. 6 shows an example thereof. In the modified example shown in FIG. 6, the axial position of the permanent magnet 28 is fixed by two spacers 32A, 32B fitted over the two ends of the permanent magnet 28 respectively. In this case, the permanent magnet 28 itself does not need to contact the side wall 26b of the holder 26 directly. Moreover, stress applied to the permanent magnet 28 is relieved even more easily by the spacers 32A, 32B.

Figure 7:
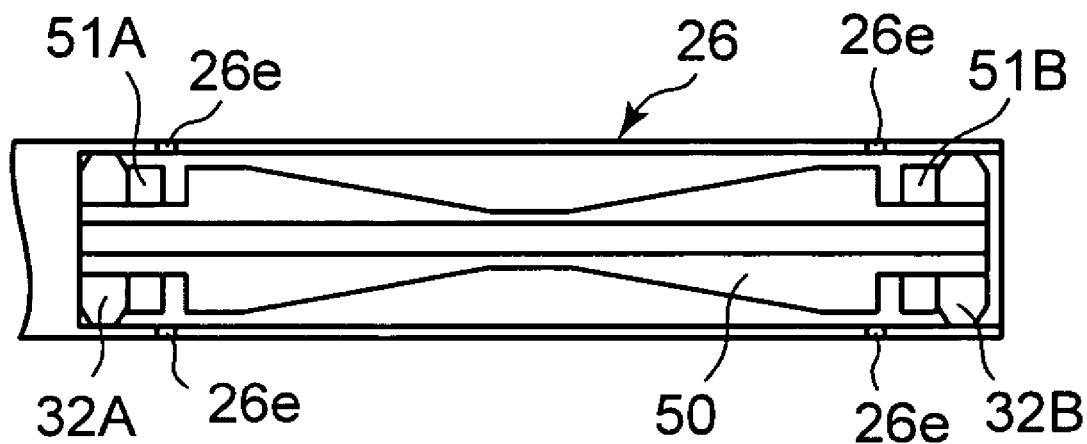
FIG. 7 is a sectional view showing a modified example in which a composite body combining two permanent magnets and a magnetic material is used as a magnetic field generating source.

Further, a composite body combining one or a plurality of permanent magnets with a magnetic material may be used as the magnetic field generating source instead of the single permanent magnet 28. FIG. 7 shows an example thereof. In the modified example shown in FIG. 7, two annular permanent magnets 51A, 51B are fitted over the two end portions of a cylindrical yoke 50 made from a magnetic material having a high permeability. To make the distribution of the magnetic field formed by this composite body of the yoke 50 and the permanent magnets 51A, 51B linear, the yoke 50 takes an outer form whereby its outer diameter is greatest at the two end portions and tapers toward the center. The axial position of this composite body is also fixed by the two spacers 32A, 32B fitted respectively over two locations at the two ends.

One embodiment and several modified examples of the present invention were described above. In all of these cases, the operation performed during assembly to mount the permanent magnet 28 (or the composite body of the yoke 50 and permanent magnets 51) in the shaft 24 of the movable plug 14 is easier and quicker than that of the prior art. More specifically, by means of a simple operation to fit the single spacer 32 (or plurality of spacers) over the permanent magnet 28 (or the composite body of the yoke 50 and permanent magnets 51), insert the permanent magnet 28 into the interior space 26a of the holder 26 from the opening 26c at the rear end of the holder 26, and form a stopper at the opening 26c, the permanent magnet 28 (or the composite body of the yoke 50 and permanent magnets 51) is itself fixed in a prescribed position which is coaxial with the holder 26.

The embodiment and modified examples described above are merely examples used to describe the present invention, and the scope of the present invention is not limited to this embodiment alone. The present invention maybe implemented in various other modes without departing from the spirit thereof.

What is claimed is:

1. A magnetic field forming device for providing a magnetic field in an exterior space, comprising:
    a shaft having a tubular part with a side wall which surrounds a columnar interior space, and an opening provided in one end of the tubular part;
    a rod-form magnetic member for generating the magnetic field, which is inserted into the interior space in the tubular part of the shaft and fixed to the tubular part; and
    an annular spacer which is fitted over the magnetic member and attached firmly to the side wall of the tubular part, thereby fixing a central axis of the magnetic member in a prescribed position within the tubular part.

2. The magnetic field forming device according to claim 1, comprising a stopper in a vicinity of the opening in the tubular part for fixing the magnetic member within the tubular part such that the magnetic member does not move in the direction of the central axis.

3. The magnetic field forming device according to claim 1, wherein a hole or a groove for linking the interior space of the tubular part of the shaft to an exterior space of the shaft is provided in the side wall of the tubular part or the spacer.

4. The magnetic field forming device according to claim 1, wherein the spacer is disposed in a vicinity of the opening in the tubular part,
    a hole or a groove for linking the interior space in the tubular part of the shaft to an exterior space of the shaft is provided in the spacer, and
    a stopper is provided in a vicinity of the opening in a position which does not block the hole or groove, for fixing the magnetic member within the tubular part such that the magnetic member does not move in the direction of the central axis.

5. A displacement sensor comprising a main body having a magnetic sensing device, and a magnetic field forming device which is capable of moving relative to the main body and provides a magnetic field of an intensity corresponding to displacement in a position of the magnetic sensing device, wherein the magnetic field forming device comprises:
    a shaft having a tubular part with a side wall which surrounds a columnar interior space, and an opening provided in one end of the tubular part;
    a rod-form magnetic member for generating the magnetic field, which is inserted into the interior space in the tubular part of the shaft and fixed to the tubular part; and
    an annular spacer which is fitted over the magnetic member and attached firmly to the side wall of the tubular part, thereby fixing a central axis of the magnetic member in a prescribed position within the tubular part.

* * * * *